(12) United States Patent
Seifert

(10) Patent No.: US 9,090,203 B2
(45) Date of Patent: Jul. 28, 2015

(54) REAR END COLLISION PREVENTION APPARATUS

(71) Applicant: Jerry A. Seifert, Uniontown, OH (US)

(72) Inventor: Jerry A. Seifert, Uniontown, OH (US)

( * ) Notice: Subject to any disclaimer, the term of this patent is extended or adjusted under 35 U.S.C. 154(b) by 68 days.

(21) Appl. No.: 13/919,113

(22) Filed: Jun. 17, 2013

(65) Prior Publication Data

US 2014/0368324 A1    Dec. 18, 2014

(51) Int. Cl.
*B60Q 1/44* (2006.01)
*G08G 1/16* (2006.01)
*B60Q 9/00* (2006.01)

(52) U.S. Cl.
CPC .............. *B60Q 9/008* (2013.01); *G08G 1/166* (2013.01)

(58) Field of Classification Search
USPC .................. 340/435, 568, 469, 479
See application file for complete search history.

(56) References Cited

U.S. PATENT DOCUMENTS

| | | | |
|---|---|---|---|
| 3,949,362 A * | 4/1976 | Doyle et al. ............. | 340/435 |
| 4,550,305 A | 10/1985 | Bookbinder | |
| 4,958,143 A | 9/1990 | Knauff | |
| 5,760,708 A | 6/1998 | Seith | |
| 6,025,775 A | 2/2000 | Erlandson | |
| 6,411,204 B1 | 6/2002 | Bloomfield et al. | |
| 6,988,026 B2 | 1/2006 | Breed et al. | |
| 7,103,460 B1 | 9/2006 | Breed | |
| 7,375,627 B2 * | 5/2008 | Johnson et al. ............. | 340/468 |
| 7,421,321 B2 | 9/2008 | Breed et al. | |
| 7,768,385 B1 * | 8/2010 | Juranovich et al. .......... | 340/479 |
| 7,859,391 B1 | 12/2010 | Solis | |
| 8,049,610 B2 * | 11/2011 | Malik ............. | 340/471 |
| 8,463,765 B2 | 6/2013 | Lesavich | |
| 2002/0075148 A1 | 6/2002 | Boyer et al. | |
| 2002/0190854 A1 | 12/2002 | Swan et al. | |
| 2003/0043033 A1 | 3/2003 | Lee | |
| 2004/0130442 A1 | 7/2004 | Breed et al. | |
| 2005/0192727 A1 | 9/2005 | Shostak et al. | |
| 2005/0273218 A1 | 12/2005 | Breed et al. | |
| 2006/0125616 A1 | 6/2006 | Song | |
| 2007/0040664 A1 * | 2/2007 | Johnson et al. ............. | 340/467 |
| 2009/0242600 A1 | 10/2009 | Helms et al. | |
| 2009/0322508 A1 * | 12/2009 | Malik ............. | 340/471 |

(Continued)

FOREIGN PATENT DOCUMENTS

| | | |
|---|---|---|
| EP | 1 967 416 A2 | 10/2008 |
| WO | PCT/US2013/048596 | 7/2013 |
| WO | WO 2014/008201 A1 | 1/2014 |

OTHER PUBLICATIONS

Oct. 9, 2013, International Search Report PCT/US2013/048,596 Jerry A. Seifert (5 pages).

(Continued)

*Primary Examiner* — Travis Hunnings
(74) *Attorney, Agent, or Firm* — Lesavich High-Tech Law Group, S.C.; Stephen Lesavich

(57) ABSTRACT

A rear end collision apparatus. The rear end collision apparatus includes a first warning light to capture a driver's attention indicating a slow down or stop event is about to occur or is occurring and re-focuses a drivers' visual attention point and a different type of second warning light indicating the vehicle has not yet started re-accelerating after a slowing or stop event. The rear end collision prevention apparatus may be integrated into a Center High Mount Stop Lamp (CHMSL) on a vehicle or used as a separate apparatus. The read end collision apparatus helps reduce or prevent rear end collisions of vehicles and reducing or preventing driver acclimatization to warning lights in a CHMSL or other rear end collision warning lights.

20 Claims, 10 Drawing Sheets

(56) References Cited

U.S. PATENT DOCUMENTS

| | | |
|---|---|---|
| 2010/0066528 A1* | 3/2010 | Kim .............................. 340/479 |
| 2011/0208710 A1 | 8/2011 | Lesavich |
| 2011/0235627 A1 | 9/2011 | Wang |
| 2011/0307156 A1* | 12/2011 | Van Neste ...................... 701/96 |
| 2012/0278622 A1 | 11/2012 | Lesavich et al. |
| 2013/0093582 A1* | 4/2013 | Walsh et al. ................. 340/436 |

OTHER PUBLICATIONS

Charles J. Kahane, PhD and Ellen Hertz, PhD, "The Long-Term Effectiveness of Center High Mounted Stop Lamps in Passenger Cars and Light Trucks," NHTSA Technical Report No. DOT HS 808 696, Mar. 1998.

"The Long-Term Benefits and Costs of CHMSL," Chapter 4, NHTSA Technical Report No. DOT HS 808 696, Mar. 1998.

Canadian Transport Agency, "The Impact of Cognitive Distraction on Driver Visual behavior and Vehicle Control," TP# 13889 E, Feb. 2002.

David L. Strayer, Joel M. Cooper, Jonna Turrill, James Coleman, Nate Medeiros Ward, and Francesco Biondi published a study entitled "Measuring Cognitive Distraction in the Automobile," AAA Foundation for Traffic Safety, Jun. 2013.

* cited by examiner

TIME T2
INDIVIDUAL
ACTIVATION
LIGHT 2

TIME T1
SIMULTANEOUS
ACTIVATION OF
WARNING LIGHTS 1 & 2

REAR END COLLISION PREVENTION APPARATUS

FIELD OF THE INVENTION

This invention relates to preventing vehicle accidents. More specifically, it relates to a rear end collision prevention apparatus.

BACKGROUND OF THE INVENTION

"Distracted driving" is driving while engaged in other activities—such as using a cell phone, texting, eating, or reading—which take the driver's attention away from the road. Distractions while driving can be separated into three distinct groups: visual, manual, and cognitive. "Visual distraction" involves taking one's eyes off the road. "Manual distraction" involves taking one's hands off the wheel. "Cognitive distraction" occurs when an individual takes their mind off of driving. All distractions compromise the safety of the driver, passengers, bystanders, and other individuals on the road.

An examination of highway safety statistics reveal that approximately one third of all highway accidents that occur on the worlds' highways are rear end crashes. The cost of lives, injuries and consequences related to these accidents are overwhelming. Consider the two categories of vehicles that transport people and goods in our world; (1) Those using highways (automobiles, trucks, buses etc); and (2) Non highway use (aircraft, trains, ships etc).

Upon investigation, it becomes apparent that the "Non highway use" vehicles absolutely dominate the favorable safety statistics available. The logical and rational question immediately becomes why? The answer: Because without exception, any of the vehicles included in "Non highway use" have the ability to communicate either with each other or a traffic control entity (or both), so as to maintain safe separation between themselves and all others and they do it in all weather at any speed.

In North America since 1986, in Australia and New Zealand since 1990, and in Europe since 1998, a central brake lamp, mounted higher than the vehicle's left and right brake lamps and called a "Center High Mount Stop Lamp (CHMSL)", is required in addition to the left and right brake lamps. The CHMSL is also sometimes referred to as the "center brake lamp", the "third brake light", the "eye-level brake lamp", the "safety brake lamp", or the "high-level brake lamp."

The CHMSL is intended to provide a deceleration warning to following drivers whose view of the vehicle's left and right stop lamps is blocked by interceding vehicles. It also helps to disambiguate brake vs. turn signal messages in North America, where red rear turn signals identical in appearance to stop lamps are permitted, and also can provide a redundant stop light signal in the event of a stop lamp malfunction.

As a result of tests completed in the early 1980s, the National Highway Traffic Safety Administration NHTSA has estimated that for every dollar spent on manufacturing and installing the CHMSL, $3.18 is saved in accident damage. However, the CHMSL and other types of third brake lights still did not prevent a majority of rear end collisions.

In addition, several studies have shown that drivers begin to "acclimatize" to the lights in a CHMSL and pay somewhat less attention to them. This reduces the effectiveness of CHMSL in preventing rear end collisions.

There have been attempts to solve the rear end collision problems. For example, U.S. Published Patent Application US2002/0190854A1 published by Swan disclose A deceleration light warning system has a pressure sensor monitor coupled to an acceleration pedal of the vehicle. The pressure sensor monitor is used for monitoring pressure applied to the acceleration pedal. A controller is coupled to the pressure sensor. The controller is used for receiving a signal from the pressure sensor and for calculating the pressure applied to the acceleration pedal. A light warning system is coupled to the controller and to the vehicle. The light warning system is used for receiving a first signal from the controller to illuminate when the pressure on the acceleration pedal decreases and for receiving a second signal from the controller to deilluminate when the pressure on the acceleration pedal is one of a constant or increases.

U.S. Published Patent Application US2003/0043033A1 published by Lee discloses "A vehicle safety warning control system comprises an accelerator pedal sensor associated with an accelerator pedal, a brake pedal sensor associated with a brake pedal to detect a normal braking and a panic braking, an impact sensor comprising an impact switch and a processor to detect collision, and a relay connected to the accelerator pedal sensor, the brake pedal sensor and the impact sensor. The relay controls at least one of brake lights and additional lights in response to the brake pedal sensor and the impact sensor. The accelerator pedal has a sensor switch disposed on the accelerator pedal to detect removal of pressure imposed thereon. When the sensor switch in enabled, the accelerator pedal sensor causes the brake lights to be energized at a less than full intensity."

U.S. Published Patent Application US2006/0125616A1 published by Chong discloses "The present invention provides a method for a changing safety signaling system. The safety signaling system can change as a result of changing driving conditions that stem from changes in the weather or changes in vehicle velocity. As a vehicle brakes, coasts, turns, or accelerates, front-facing, side-facing, top-facing, and/or rear facing indicators can communicate vehicular acceleration, coasting, and braking to a pedestrian or other vehicles. A distance sensor can be used to trigger a signal to alert a second vehicle that the first vehicle is braking hard and slowing fast or can be used to warn the operator of the first car that a collision may be imminent and can be used to warn the operator of a second car that measures can be taken to avoid a collision or minimize damage from a collision. The instant invention can be utilized by either a first car or a second car."

U.S. Pat. No. 3,949,362 to Doyle et al. discloses "A warning system and methods for vehicles traveling in tandem. A signal beam of energy is emitted from a leading vehicle and is directed toward the roadway to indicate a safe stopping distance. The signal beam is automatically displaced in response to changes in vehicle speed to indicate a new safe stopping distance. The signal emitter may comprise a lamp for emitting a visible light beam. A signal detector may be provided on the trailing vehicle to detect the energy beam from the leading vehicle."

U.S. Pat. No. 5,760,708 to Seth discloses "A device and method to avoid collisions is described. The device and method is primarily directed to preventing tail-gating by motorists and the avoidance of otherwise resultant collisions. The method and device may also be utilized to detect stationary objects and to alert the driver of a vehicle of an imminent collision."

U.S. Pat. No. 6,249,219 to Perez discloses "a severe braking warning system for a vehicle wherein the system is designed to measure a vehicle's rate of motion and, upon deceleration of the vehicle, affect the vehicle's brake light circuit by switching it on and off at a pulse rate proportional to the severity of deceleration. The system comprises an accelerometer, a microprocessor (either an integrated unit or the vehicle's existing unit), transistor, and a switch in communication with the vehicle's existing brake light circuit. The inventive brake light warning system provides a supplemental indication to other vehicles traveling behind of the rate of braking, thereby reducing the possibility of rear-end collisions. Unfortunately, this prior art reference does not provide a warning when a trailing vehicle is traveling too closely while maintaining a steady speed on the road."

U.S. Pat. No. 6,351,211 to Bussard discloses "a brake strobe system providing a visual warning system designed to prevent accidents and multi-car pileups. When a driver quickly and forcefully applies his brakes, a strobe light is activated. The harder a driver brakes, the faster and brighter the strobe blinks, thereby warning other drivers of potential hazards. The system also has the ability to brighten or dim the strobe to compensate for weather and day or night driving conditions. It also has the ability to change modes or presets according to the speed of the vehicle. In the event that a car's airbag deploys, the brake strobe system will automatically activate to warn other drivers and alert emergency response personnel. Unfortunately, this prior art reference employed in the existing brake lights may not adequately warn trailing drivers who are not familiar with the system and who may mistake the blinking lights as simply the driver tapping the breaks repeatedly."

U.S. Pat. No. 6,411,204 to Bloomfield discloses "an anti-collision safety light control for a vehicle including a microprocessor which receives one or more inputs and controls an output of at least one indicator or signaling device in response to the inputs. The microprocessor is continuously powered or energized when the vehicle is in use, such that the indicator may be modulated in situations when the brake pedal of the vehicle is not applied. Preferably, an accelerometer may be included with the safety light system to provide a deceleration signal to the microprocessor, which may determine whether the deceleration is at or above one or more threshold levels and correspondingly modulate the indicator in accordance with the particular threshold level encountered. The microprocessor may modulate the indicator independent of actuation of the brake pedal by a driver of the vehicle. However, this prior art reference does not provide a light-emitting diode message display system that sequentially illuminates selected diodes for generating a warning message to more adequately warn the trailing vehicle."

U.S. Pat. No. 6,988,026 to Breed discloses "Arrangement and method for monitoring a tire mounted to the vehicle in which a thermal radiation detecting device detects the temperature of the tire at different circumferential locations along the circumference of the tire. The detected temperatures of the tire are analyzed to determine, for example, whether a difference in thermal radiation is present between the circumferential locations of the tire, and if so, an action is effected in response to the analysis. The thermal radiation detecting devices are preferably supplied with power wirelessly, e.g., through an inductive system, a capacitive system or a radio frequency energy transfer system."

U.S. Pat. No. 7,103,460 to Breed discloses "Method and system for diagnosing whether vehicular components are operating abnormally based on data obtained from sensors arranged on a vehicle. In a training stage, output from the sensors during normal operation of the components is obtained, each component is adjusted to induce abnormal operation thereof and output from the sensors is obtained during the induced abnormal operation. A determination is made as to which sensors provide data about abnormal operation of each component based on analysis of the output from the sensors during normal operation and during induced abnormal operation of the components. During operation of the vehicle, the output from the sensors is obtained and analyzed, e.g., by inputting it into a pattern recognition algorithm or neural network generated during the training stage, in order to output an indication of abnormal operation of any components being diagnosed."

U.S. Pat. No. 7,375,627 to Johnson et al. discloses "Collision deterrence system including signaling apparatus and method collision having frequency diversity, amplitude diversity, duty cycle diversity, and modal diversity and capable of being perceived by the following vehicle operator as being indicative of a lead vehicle motive state. The apparatus produces distinctive visual and aural signals constituting a characteristic hazard alert, representative of a lead vehicle motive state. The method generates an unambiguous signal representative of a predetermined hazard in the vehicle travel path. A collision deterrence diversity signaling method provides unique visual and audible signals directed toward a following vehicle operator, eliciting a REC avoidance response."

U.S. Pat. No. 7,421,321 to Breed discloses "System for obtaining information about a vehicle or a component therein includes sensors arranged to generate and transmit a signal upon receipt and detection of a radio frequency (RF) signal and a multi-element, switchable directional antenna array. Each antenna element is directed toward a respective sensor and transmitter RF signals toward that sensor and receive return signals therefrom. A control mechanism controls transmission of the RF signals from the antenna elements, e.g., causes the antenna elements to be alternately switched on in order to sequentially transmit the RF signals and receive the return signals from the sensors or cause the antenna elements to transmit the RF signals simultaneously and space the return signals from the sensors via a delay line in circuitry from each antenna element such that each return signal is spaced in time in a known manner without requiring switching of the antenna elements."

U.S. Pat. No. 7,859,391 to Solis discloses "An automated leading-vehicle message warning system for notifying a trailing vehicle of an unsafe traveling condition preferably includes a vehicle speedometer sensor and a vehicle brake system sensor. The warning system also may include a mechanism for determining whether a real-time traveling condition between the leading and trailing vehicles is a safe traveling condition by detecting whether the trailing vehicle is traveling at a minimum safe linear distance directly behind the leading vehicle upon receipt of input signals from a speedometer sensor and a vehicle brake system sensor. The warning system may also include a plurality of transducers housed in the leading vehicle that may be selectively toggled to respective activate modes such that each of the transducers generates and transmits a unique warning signal when the trailing vehicle fails to maintain the minimum safe distance from the leading vehicle during the unsafe traveling condition."

U.S. Pat. No. 8,305,936 to Wang discloses "A method and system for dynamic information exchange on a mesh network in a vehicle. The dynamic information exchange includes determining if a vehicle needs immediate repair. And if so, automatically determining a nearest repair facility and sending a message to the nearest repair facility indicating the vehicle will be arriving shortly. The message also includes a list of parts required to repair the vehicle. The dynamic information exchange on the mesh network also includes information about vehicle movement, including, an accident impact, theft or illness or injury to an operator of the vehicle."

Toyota, Mercedes-Benz, Volvo, and BMW have recently released vehicles equipped to convey a special light signal when the vehicle is braked rapidly and severely. This is officially referred to as "Emergency Stop Signal", and ECE Regulation 48 calls for the lamps providing the ESS to flash at 4 Hz when a passenger car decelerates at greater than 6 m/s$^2$ or a truck or bus decelerates at greater than 4 m/s$^2$. Mercedes vehicles flash the stop lamps for the ESS, while vehicles from the Volkswagen Group of manufacturers (VW, Audi, SEAT & Skoda) flash the hazard flashers.

However, these emergency stop signals do not prevent rear end collisions in every day situations in the majority of cases. Thus, it is desirable to provide a rear end collision prevention apparatus for vehicles used on highways.

SUMMARY OF THE INVENTION

In accordance with preferred embodiments of the present invention, some of the problems associated with rear end collisions are overcome. A rear end collision prevention apparatus is presented.

The rear end collision apparatus on a vehicle includes a first warning light indicating a slow down or stop event is about to occur or is occurring and re-focuses a drivers' visual attention point and a different type of second warning light indicating the vehicle has not yet started re-accelerating after a slowing or stop event. The rear end collision prevention apparatus is integrated into a Center High Mount Stop Lamp (CHMSL) on the vehicle or used as a separate apparatus. The read end collision apparatus helps reduce or prevent rear end collisions of vehicles and reducing or preventing driver acclimatization to warning lights in a CHMSL or other rear end collision warning lights.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Rear End Collsion Prevention Apparatus

Figure 1:
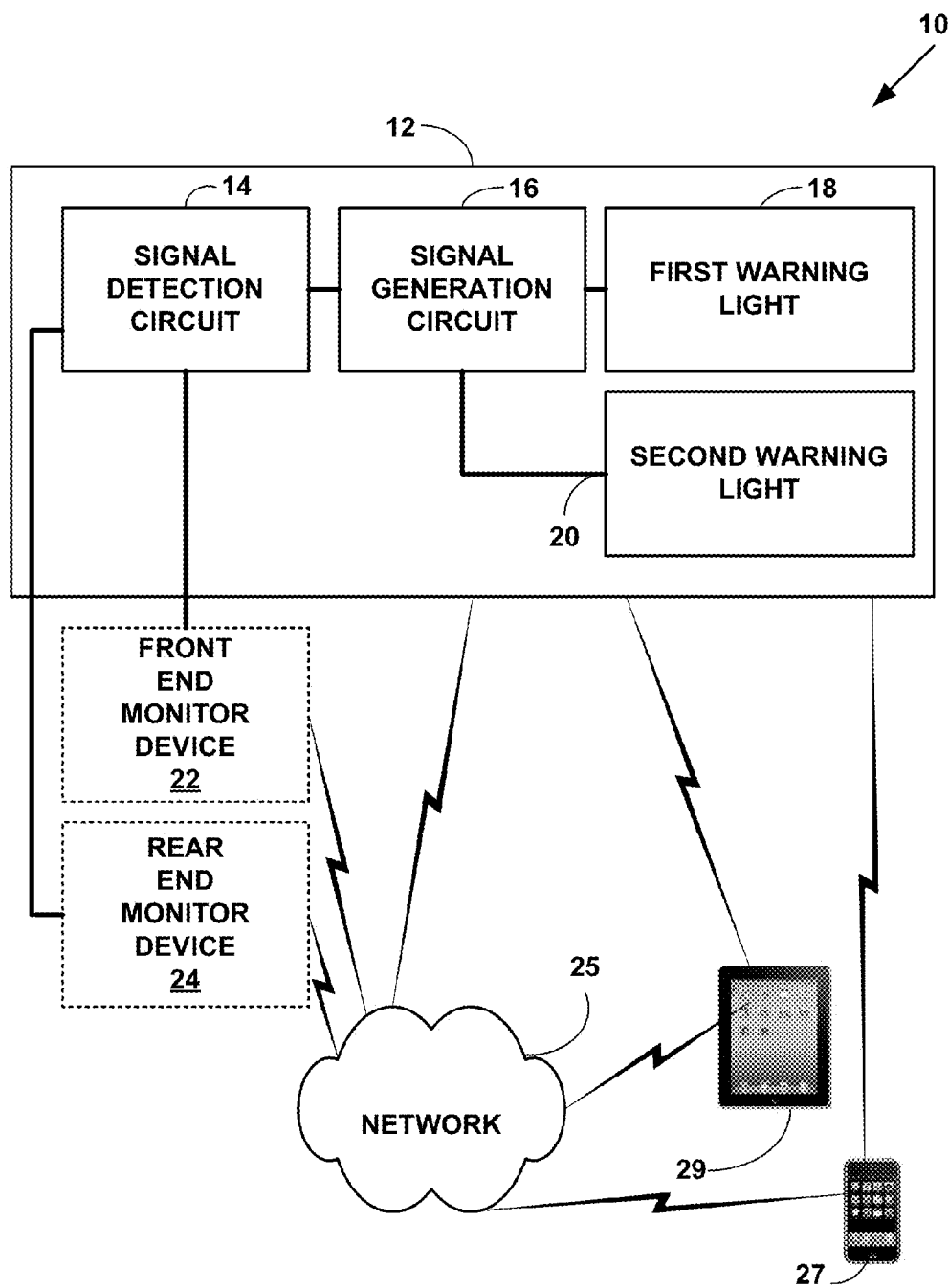
FIG. 1 is a block diagram of a rear end collision prevention apparatus.

FIG. 1 is a block diagram 10 of a rear end collision prevention apparatus 12. The apparatus 12 includes a signal detection circuit 14, a signal generation circuit 16, a first warning light 18, a second warning light 20, connected to an optional front end monitor 22, and/or connected to an optional rear end monitor 24. However, the present invention is not limited to this embodiment and more, fewer, other and equivalent components can also be used to practice the invention.

In one embodiment, the rear end collision apparatus 12 includes a wired device with a wired interface and/or a wireless device with a wireless interface to interface with a control system in a vehicle 28.

In one embodiment, the vehicle 28 includes a land vehicle (car, truck, motorcycle, bicycle, all terrain vehicle (ATV), etc.), marine vehicle (boat, ship, personal watercraft (e.g., jet ski, etc.), etc.), aviation vehicle (airplane, helicopter, etc.), space vehicle (space shuttle, space craft, rocket, satellite, etc.) and/or rail road vehicle (locomotive, etc.). However, the present invention is not limited to such an embodiment, and other types of vehicles can be used to practice the invention.

The wired interface is wired to an internal wiring system of the vehicle 28 (e.g., the accelerator circuit, etc.)

Wireless Connections

In one embodiment, the apparatus 12 includes one or more different types of wireless interfaces.

In one embodiment of the present invention, the wireless interfaces include but are not limited to, a Radio Frequency (RF), an Institute of Electrical and Electronic Engineer (IEEE) 802.11a, 802.11b, 802.11g, 802.11n, 802.15.4 (ZigBee), 802.16a, 802.16g, "Wireless Fidelity" (WiFi), "Worldwide Interoperability for Microwave Access" (WiMAX), European Telecommunications Standards Institute (ETSI) High Performance Radio Metropolitan Area Network (HIPERMAN), RF-Home, wireless personal area network (WPAN), Radio Frequency Identifier (RFID), Near Field communications (NFC) and/or machine-to-machine (M2M) communications or other types of wireless interfaces. However, the present invention is not limited to such wireless interface and other types of wireless interfaces can also be used.

In another embodiment of the present invention, the wireless interfaces includes a wireless sensor device that comprises an integral or separate Bluetooth and/or infra data association (IrDA) module for wireless Bluetooth or wireless infrared communications.

Radio frequency (RF) wireless signal in the range of about 3 kHz to 300 GHz. 802.11b is a short-range RF wireless network standard. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11b and 802.11g standards are incorporated herein by reference.

WiFi is a type of 802.11xx interface, whether 802.11b, 802.11a, dual-band, etc. WiFi devices include an RF interfaces such as 2.4 GHz for 802.11b or 802.11g and 5 GHz for 802.11a. More information on Wi-Fi can be found at the URL "www.weca.net."

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully handshaked protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WPAN.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WPAN.

Bluetooth is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. is incorporated herein by reference.

The Infrared Data Association (IrDA) provides specifications for a complete set of protocols for wireless infrared communications. The name "IrDA" also refers to that set of protocols. IrDA is used for wireless data transfer over the "last one meter" using point and shoot principles. Thus, it has been implemented in portable devices such as mobile phones, laptops, cameras, printers, medical devices and many more. Main characteristics of this kind of wireless optical communication is physically secure data transfer, Line-of-Sight (LOS) and very low bit error rate (BER) that makes it very efficient.

A "RFID tag" is an object that can be applied to or incorporated into a vehicle for the purpose of sending unique RF signals.

An "RFID sensor" is a device that measures a physical quantity and converts it into an RF signal which can be read by another circuit.

In one embodiment, the wireless interfaces include wireless personal area network (WPAN) interfaces. A WPAN is a personal area network for interconnecting devices in which the connections are wireless. A WPAN interconnects all the ordinary computing and communicating devices in a vehicle 28

Typically, a WPAN uses some technology that permits communication only within about 10 meters. One such technology is "Bluetooth." Another such technology is "Zigbee."

"Near field communication (NFC)" is a set of standards for smartphones and similar smart network devices to establish radio communication with each other by touching them together or bringing them into close proximity, usually no more than a few inches and/or a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or sensor and/or other types of tags and/or sensors.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as, etc.), which is relayed through a network (wireless, wired, etc.) to an application (software program), that translates the captured event into meaningful information.

M2M communication has expanded beyond a one-to-one connection and changed into a system of networks that transmits data many-to-one and many-to-many to plural different types of devices and appliances. The expansion of Internet Protocol (IP) networks has made it far easier for M2M communication to take place and has lessened the amount of power and time necessary for information to be communicated between machines.

The signal detection circuit 14 includes a wireless interface to a wireless communications network 25, including but not limited to, a wireless messaging network, a wireless cellular telephone network, a Packet Cellular Network (PCN), Global System for Mobile Communications, (GSM), Generic Packet Radio Services (GPRS), network/Personal Communications Services network (PCS), a Cellular Digital Packet Data (CDPD), Wireless Application Protocol (WAP), Digital Audio Broadcasting (DAB) network, Transmission Control Protocol (TCP)/User Datagram Protocol (UDP)/Internet Protocol (IP) network, Voice over IP (VoIP) network, Short Messages Service (SMS), Instant Message (IM) or other types of wireless network, internal and/or external to the vehicle 28.

The wireless cellular telephone network includes, but is not limited to Code Division Multiple Access (CDMA), Time Division Multiple Access (TDMA), or other wireless technologies.

PCS networks include network that cover a range of wireless, digital communications technologies and services, including cordless phones, mobile phones, voice mail, paging, faxing, mobile personal digital/data assistants (PDAs), etc. PCS devices are typically divided into narrowband and broadband categories.

Narrowband devices, which operates in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM is gaining popularity in the United States. GSM is a wireless platform based on TDMA to digitize data. GSM includes not only telephony and Short Message Services (SMS) but also voice mail, call forwarding, facsimile, caller ID, Internet access, and e-mail.

GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 Mhz and a tri-band mode include 900/1800/1900 Mhz.

GPRS is a standard for wireless communications, which runs at speeds up to 150 kilo-bits-per-second ("kbit/s"). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. A Packet Cellular Network (PCN) includes various types of packetized cellular data.

IP is an addressing protocol designed to route traffic within a network or between networks. For more information on IP see IETF RFC-791 incorporated herein by reference.

TCP provides a connection-oriented, end-to-end reliable protocol designed to fit into a layered hierarchy of protocols that support multi-network applications. For more information on TCP see RFC-793, incorporated herein by reference.

UDP provides a connectionless mode of communications with datagrams in an interconnected set of networks. For more information on UDP see ITEF RFC-768 incorporated herein by reference.

VoIP is a set of facilities for managing the delivery of voice information using IP packets. In general, VoIP is used to send voice information in digital form in discrete data packets (i.e., IP packets) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc.) that convert a voice signal into a stream of packets (e.g., IP packets) on a packet network and back again.

VoIP allows voice signals to travel over a stream of data packets over a communications network.

Short Message Service (SMS) is a text messaging service component of phone, web, or mobile communication systems, using standardized communications protocols that allow the exchange of short text messages of up to 160 characters, or more.

Instant messaging (IM) is a type of messaging which offers real-time text transmission over a local area network (LAN).

However, the present invention is not limited to such wireless interfaces and wireless networks and more, fewer and/or other wireless interfaces can be used to practice the invention.

Security and Encryption

The apparatus 12 and wired and wireless interfaces of the present invention include plural security and/or encryption methods for secure communications. The wireless and wired signal detected and/or sent and/or received are done so securely with the plural security and/or encryption methods described herein.

For example, Wireless Encryption Protocol (WEP) (also called Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wireless or Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

DES is a popular symmetric-key encryption method developed in 1975 and standardized by ANSI in 1981 as ANSI X.3.92, the contents of which are incorporated herein by reference. 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired, incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

A way to check the integrity of information transmitted over or stored in an unreliable medium such as a wireless network is a prime necessity in the world of open computing and communications. Mechanisms that provide such integrity check based on a secret key are called "message authentication codes" (MACS). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

Independent Moving Vehicle Light Activation

In one embodiment, the signal detection circuit 14 is configured for detecting a driver of moving vehicle 28 that is engaging in one or more of plural slowing event including, but not limited to: (1) releasing of an accelerator pedal; (2) releasing of a throttle control in a moving vehicle 28; (3) disengaging a cruise control mechanism previously set and in use in the moving vehicle 28; (4) engaging a brake pedal and/or a brake control in the moving vehicle 28; (5) receiving an input from a front end monitor 22 in the moving vehicle 28. The front end monitor 22 automatically detects when a front portion of the moving vehicle 28 comes within a pre-determined distance from another moving vehicle 31 or stopped vehicle in front of the moving vehicle or within a certain distance of a solid object 33 in front of the moving vehicle; (6) receiving an input from a rear end monitor 24, wherein the rear end monitor 24 automatically detects when a second vehicle 30 comes within a pre-determined distance from a rear portion of the moving vehicle 28; and/or or (7) receiving an input from steering device indicating a large movement in the steering device. The large movement in a steering device such as a steering wheel, control yolk, rudder, etc. indicates an abrupt movement to avoid colliding with another vehicle or object.

In one embodiment, the signal detection circuit 14 is automatically enabled when the vehicle 28 reaches a first pre-determined speed. The signal detection circuit 14 is automatically disabled when the vehicle reaches a second slower pre-determined speed. In one embodiment, the first pre-determined speed includes a pre-determined crash safety speed and second slower pre-determined speed includes at least ten miles-per-hour or at least sixteen kilometers-per-hour. However, the present invention is not limited to the speed described and other speeds of a moving vehicle can be used to practice the invention.

The signal generation circuit 16 is connected to the signal detection circuit 14 and the first warning light 18 and the second warning light 20. The signal generation circuit 16 is configured for generating a first signal (e.g., a light on signal, etc.) to light up the first warning light 18 and/or the second warning light 20 within a few milliseconds (e.g., 1-10 milliseconds) of an event detected by the signal detection circuit 14. However, the present invention is not limited to timing of a few milliseconds and other timing can be used to practice the invention.

In another embodiment, the signal generation circuit 16 is configured for generating a another signal to light up the first warning light 18 and/or the second warning light 20, either separately and/or simultaneously within a few milliseconds of a specific slowing event comprising only a signal indicating an accelerator pedal and/or control throttle has been released.

In another embodiment, the signal generation circuit 16 is configured for generating a first signal to light up the first warning light 18 and/or the second warning light 20 simultaneously within a few milliseconds of a specific slowing event comprising only a signal indicating the moving vehicle has stopped completely due to an emergency event (e.g., accident, police, fire, military, etc. event).

However, the present invention is not limited to the embodiments described and more, fewer or other signals can also be used to practice the invention.

Figure 2:
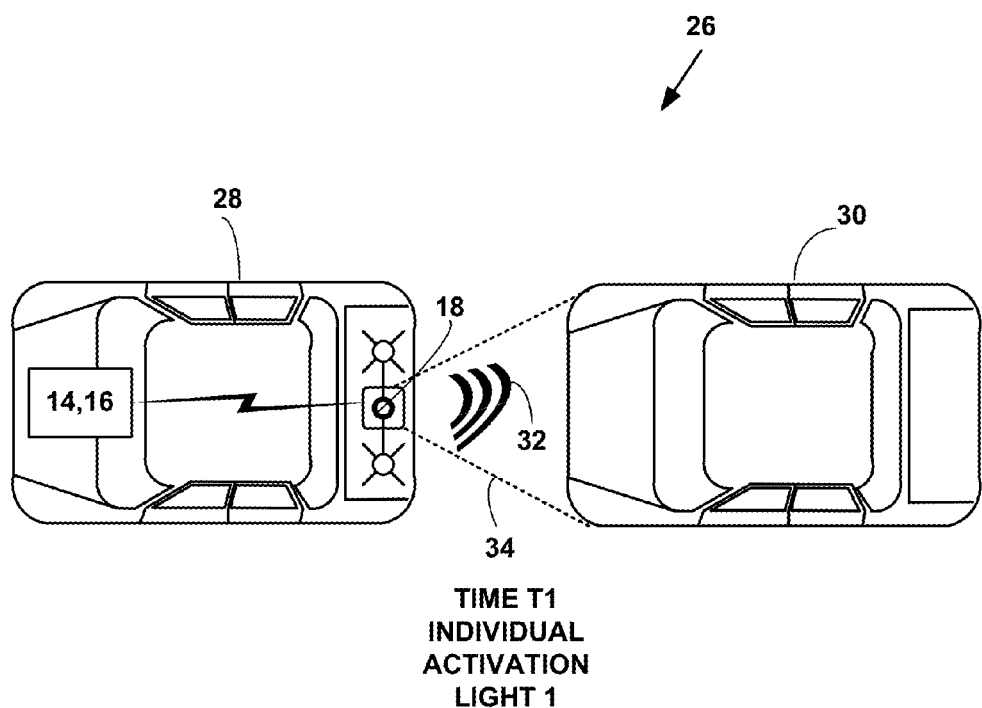
FIG. 2 is a block diagram illustrating the rear end collision prevention apparatus at time T1.

FIG. 2 is a block diagram 26 illustrating the rear end collision prevention apparatus at time T1.

FIG. 2 illustrates a first vehicle 28 that is slowing down after a driving removes his/her foot from an acceleration pedal and as second vehicle 30 is approaching behind the first vehicle 28. The signal detection circuit 14 detects a slowing event and the a signal generation circuit 16 generates a first signal to turn on the first warning light 18 within a few milliseconds of the slowing event.

In one embodiment, the first warning light 18 includes a very bright, directional strobe light (e.g., white or blue or yellow in color, etc.) 32, manufactured and installed in a directional manner so as to be able to be visible and seen 34 only by any vehicle 30 directly behind the vehicle 28 slowing down. The strobe is triggered (e.g., emit a flash or flashes, etc.) when any slowing event occurs. However, the present invention is not limited to this embodiment and types of lights (e.g., Light Emitting Diodes (LEDs), etc. incandescent light bulbs, etc. and other types of lights, etc.) and other embodiments can be used to practice the invention.

A "strobe" light or stroboscopic lamp, commonly called a strobe, is a device used to produce regular flashes of light. A typical strobe light has a flash energy in the region of 10 to 150 joules, and discharge times as short as a few milliseconds, often resulting in a flash power of several kilowatts. Strobe lights can also be used in a "continuous" mode, producing extremely intense illumination. The light source is typically a xenon flash lamp, or flashtube, which has a complex spectrum and a color temperature of approximately 5,600 Kelvins. To obtain colored strobe lights, colored gels are used. Strobe lights remain visible in low visibility and bad weather such as rain, snow, fog, etc. However, the invention is not limited to the types of strobe lights described and other types of strobe lights and lights can be used to practice the invention.

Many car accidents are caused by "cognitive distraction" of the driver. Cognitive distraction is simply another way to describe driver inattention, i.e., a driver not keeping his/her eyes and mind on the road. Driver inattention can be as dangerous as driving while intoxicated. A safe driver pays attention to the road, while, in contrast, a distracted driver literally doesn't see what is in front of his/her. Cognitive distraction occurs when a driver is making a telephone call, texting, applying make-up, becoming sleepy, etc.

The Canadian Transport Agency conducted a study entitled, "The Impact of Cognitive Distraction on Driver Visual behavior and Vehicle Control," TP#13889 E, February 2002. The contents of this study are incorporated herein by reference.

This study concluded in part that much of the information relevant to driving is taken in visually; consequently any change in drivers' visual behavior is significant for driving safety. One of the most important activities a driver must perform in the constantly changing driving environment is the determination of when and how hard to brake. Braking decisions are based on drivers' assessments of speed, distances and angles, as well as other factors relating to driving. Vision provides essential input for braking decisions. In order to make appropriate braking decisions, drivers must be actively engaged in the monitoring, gathering, and synthesis of appropriate information from the environment. When a driver is distracted by an in-vehicle task, such as making a telephone call, texting applying make-up, changing station on a radio, or by day-dreaming, deep thinking, etc., the resulting inattention to driving may reduce or delay the driver's ability to estimate these parameters and consequently delay the decision of when braking should begin. When cognitive distraction was present, slower brake response times were observed. An additional finding was that once having realized the cognitive distraction had occurred, drivers braked more intensely in an attempt to compensate for delayed detection of events outside the vehicle.

In June of 2013, David L. Strayer, Joel M. Cooper, Jonna Turrill, James Coleman, Nate MedeirosWard, and Francesco Biondi published a study entitled "Measuring Cognitive Distraction in the Automobile," AAA Foundation for Traffic Safety, June 2013, the contents of which are incorporated by reference. The study concluded that "driver distraction can theoretically be separated into visual, manual, and cognitive sources and there are significant impairments to driving that stem from the diversion of attention from the task of operating a motor vehicle, and that the impairments to driving are directly related to the cognitive workload of these in-vehicle activities."

This research also found that as "mental workload and distractions increase reaction time slows, brain function is compromised, drivers scan the road less and miss most visual cues, potentially resulting in drivers not seeing items right in front of them including stop signs and pedestrians."

The apparatus 12 of the present invention addresses these problems and improves driver safety by given a driver at least two visual cues, a first get the drivers' attention and second to continuously inform the driver of current actions in another vehicle (e.g., de-accelerating, braking, stopping, etc.).

In one embodiment, the strobe light is used for the first warning light 18, since a strobe light helps overcome a hypnotic effect of long distance driving including sleepiness and dosing off, including the type of drowsiness that occurs even before eyelid closure. The strobe light is also used to help a driver overcome distractions from inside and/or outside the vehicle 30 such as adjusting a radio, looking at something on the seat or floor, looking at and/or using a cell phone for a voice call, texting, applying make-up, looking at another vehicle, looking at a billboard, etc. The strobe light helps re-focus a drivers attention for other events can typically cannot be pre-empted unless a frontal and/or peripheral vision focus point of a driver of the second vehicle 30 can be quickly changed. However, the present invention is not limited to such an embodiment and other types of flashing lights and/or other types of lights can be used for the first warning light 18 to quickly capture a drivers attention.

Figure 3:
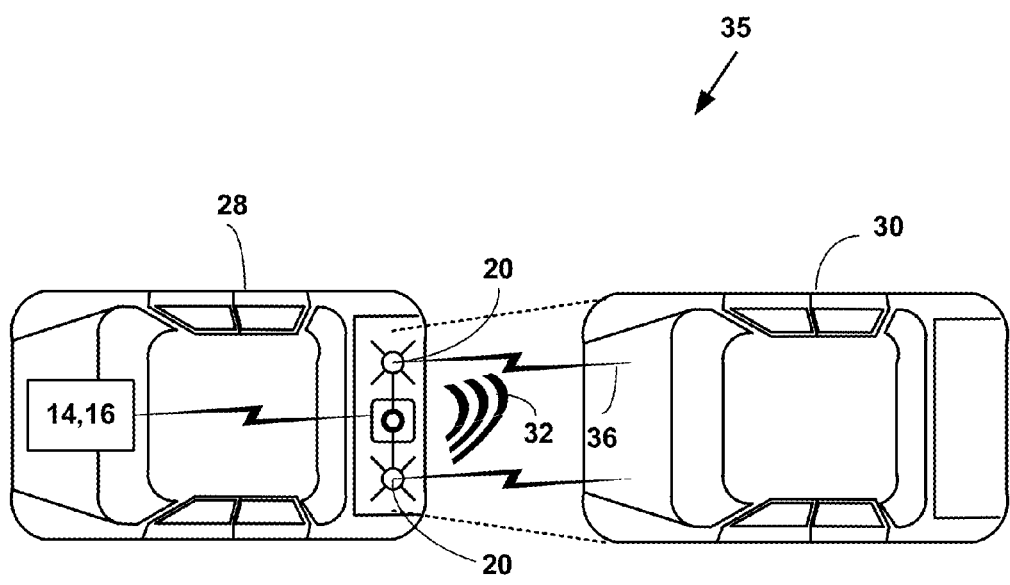
FIG. 3 is a block diagram illustrating the rear end collision prevention apparatus at time T2.

FIG. 3 is a block diagram 35 illustrating the rear end collision prevention apparatus at time T2. The second warning light 20 is illustrated as two warning lights in FIG. 3. However, the present invention is not limited to such an embodiment more, fewer and other types of lights can be used to practice the invention.

If the accelerator and/or throttle is not re-engaged within, e.g., one second or less, the signal generation circuit 16 generates a second signal to light up 36 the second warning light 20 within a few milliseconds generating the first signal to light up the first warning light 18.

In one embodiment, the second warning light 20 includes a bright and very visible static display light. The color of second warning light 20 is a very strong contrast color to contrast the light from the red tail and running lights on highway vehicles. One good example would be the color yellow or blue, a proven color for the human eye and brain to immediately interpret and one not used for running and brake lights.

In one embodiment, the second warning light 20 includes one or more light-emitting diodes (LEDs). An LED is a semiconductor light source. When an LED is forward-biased (switched on), electrons are able to recombine with electron holes within the device, releasing energy in the form of photons. This effect is called "electroluminescence" and the color of the light (corresponding to the energy of the photon) is determined by the energy gap of the semiconductor.

LEDs present many advantages over incandescent light sources including lower energy consumption, longer lifetime, improved robustness, smaller size, and faster switching. LEDs powerful enough for room lighting are relatively expensive and require more precise current and heat management than compact fluorescent lamp sources of comparable output.

In another embodiment, the second warning light 20 includes one or more incandescent light bulbs. Incandescent light bulbs produces light by heating a filament wire to a high temperature until it glows. The hot filament is protected from oxidation in the air with a glass enclosure that is filled with inert gas or evacuated. In a halogen lamp, filament evaporation is prevented by a chemical process that redeposits metal vapor onto the filament, extending its life. The light bulb is supplied with electrical current by feed-through terminals or wires embedded in the glass.

The lighting system of a motor vehicle consists of lighting and signaling devices mounted or integrated to the front, sides, rear, and in some cases the top of the motor vehicle. The purpose of this system is to provide illumination for the driver to operate the vehicle safely after dark, to increase the conspicuity of the vehicle, and to display information about the vehicle's presence, position, size, direction of travel, and driver's intentions regarding direction and speed of travel.

In another embodiment, the first warning light 18 includes a bright and very visible static display light and the second warning light 20 includes a very bright, directional strobe light. In another embodiment, both the first warning light 18 and the second warning light 20 include visible static display lights (e.g., LEDs, etc.). In another embodiment, both the first warning light 18 and the second warning light 20 include strobe lights of different colors. In another embodiment, the first warning light 18 and the second warning light 20 include strobe lights of different colors with different flashing frequencies. In another embodiment, the first warning light 18 and the second warning light 20 include strobe lights of the same color but with different flashing frequencies. However, the present invention is not limited these embodiments and/or the embodiments described and various combinations of different types of lights and/or different colors and/or different flashing frequencies that can be used to practice the invention.

The first warning light 18 attracts a frontal vision or peripheral vision focus point of a driver driving the second vehicle 30 behind the moving vehicle 28. The second warning light 20 holds a visual attention of the driver driving the second vehicle 30 behind the moving vehicle 28 and provides continuous visual information.

In one embodiment, the first warning light 18 including a strobe light and the second warning light 20 including an LED light, provides a dramatic contrast in light signal display to first attract and then hold a visual attention of the driver of the second vehicle 30 driving behind the moving vehicle 28. In another embodiment, the first warning light 18 and the second warning light 20 include LED lights of the same or a different color.

However, the present invention is not limited these embodiments and/or the embodiments described and various combinations of different types of lights and different colors of lights all can be used to practice the invention.

On motor vehicles, a Center High Mount Stop Lamp (CHMSL) is intended to provide a deceleration warning to following drivers whose view of the vehicle's left and right stop lamps is blocked by interceding vehicles. It also helps to disambiguate brake signals and turn signal messages in North America, where red rear turn signals identical in appearance to stop lamps are permitted, and also can provide a redundant stop light signal in the event of a stop lamp malfunction. The CHMSL is generally required to illuminate steadily and not permitted to flash.

On passenger cars, the CHMSL may be placed above the back glass, affixed to the vehicle's interior just inside the back glass, or it may be integrated into the vehicle's deck lid or into a spoiler or on a stalk fixed to the spare wheel carrier. Trucks, vans and commercial vehicles sometimes have the CHMSL mounted to the trailing edge of the vehicle's roof.

Charles J. Kahane, Ph.D. and Ellen Hertz, Ph.D conducted a study entitled "The Long-Term Effectiveness of Center High Mounted Stop Lamps in Passenger Cars and Light Trucks," NHTSA Technical Report Number DOT HS 808 696, March 1998, the content of which is incorporated by reference.

The study concluded in part that Center High Mounted Stop Lamps (CHMSL) have been standard equipment on all new passenger cars sold in the United States since model year 1986 and all new light trucks since model year 1994, as required by Federal Motor Vehicle Safety Standard 108. The purpose of CHMSL is to safeguard a car or light truck from being struck in the rear by another vehicle. When brakes are applied, the CHMSL sends a conspicuous, unambiguous message to drivers of following vehicles that they must slow down. NHTSA was especially encouraged to promulgate the CHMSL regulation in 1983 by three highly successful tests of the lamps in taxicab and corporate fleets, showing 48 to 54 percent reductions of "relevant" rear-impact crashes in which the lead vehicle was braking prior to the crash, as reported by the study participants. Since nearly two-thirds of all rear impact crashes involve pre-impact braking by the lead vehicle, these results are equivalent to a 35 percent reduction of rear-impact crashes of all types.

The study also noted a decline in effectiveness over time of the use of CHMSL on vehicles. The study raised the question including as more and more cars on the road have CHMSL, do drivers "acclimatize" to the lamps and pay somewhat less attention to them? and Would effectiveness of CHMSL continue to decline due to further driver acclimatize? A further study by the Insurance Institute for Highway Safety, showing an average five percent crash reduction for CHMSL, strongly suggested a continued decline in effectiveness. Even with the decline in effectiveness, the study concluded the benefits of CHMSL still far exceed the modest cost, and CHMSL continue to be a highly cost-effective safety device.

CHMSL in their current configuration currently cost about $15 for a passenger vehicle and light trucks. It has been estimated that CHMSL prevent an estimated 92,000-137,000 police-reported crashes per year, and approximately 102,000 unreported crashes. CHMSL reduce property damage and its associated societal costs by approximately $655,000,000 per year in reported and unreported crashes. The CHMSL prevents 58,000-70,000 injuries per.

The apparatus 12 helps overcome the decline in effectiveness of CHMSL by providing two different types of safety lights that do not allow a driver to acclimatize to the safety lights.

In one embodiment, the first warning light 18 and the second warning light 20 are included within a CHMSL, in a back window or other location in a vehicle and/or in a third break light, left or right break lights.

In another embodiment, the first warning light 18 and the second warning light 20 are included as an additional lighting unit used in association with the CHMSL (e.g., above, below, to the side, etc.) but no within the CHMSL.

Figure 4:
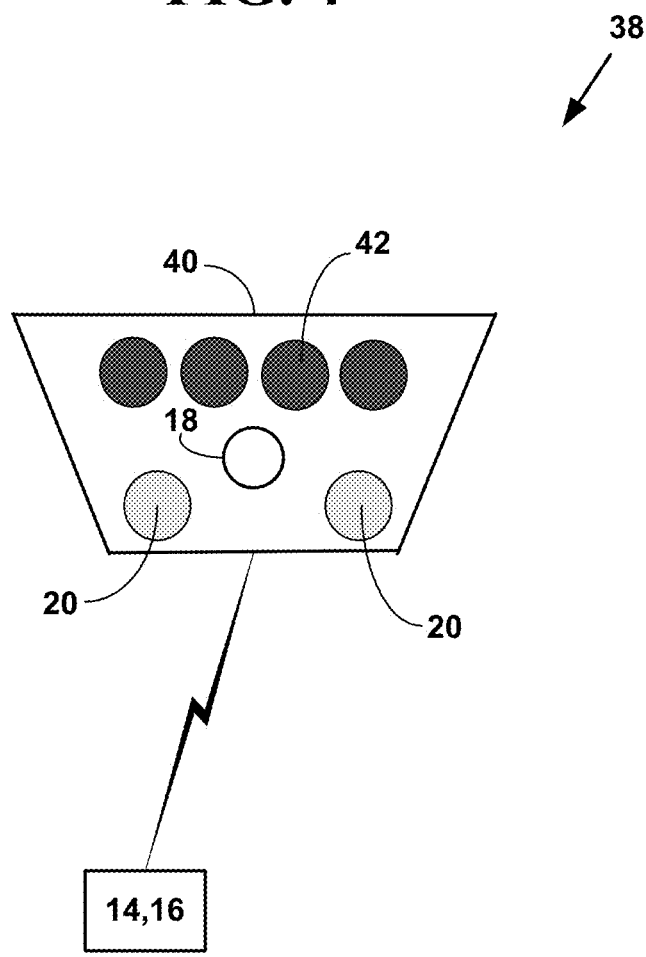
FIG. 4 is a block diagram illustrating the first warning light and the second warning light of the rear end collision prevention apparatus integrated into a Center High Mount Stop Lamp (CHMSL)

FIG. 4 is a block diagram 38 illustrating the first warning light 18 and the second warning light 20 of the rear end collision prevention apparatus 12 integrated into a Center High Mount Stop Lamp (CHMSL) 40.

The CHMSL 40 includes that standard brake lights 42 the first warning light 18 as a strobe light and the second warning light 20 as two LEDs. However, the present invention is not limited to this embodiments and other embodiments can also be used to practice the invention.

However, the present invention is not limited to these embodiments and other types of lights and other color lights and other embodiments can be used to practice the invention.

In one embodiment, to avoid a nuisance factor, timing, distances, light patterns of the apparatus 12 are dynamically configured and adjusted within the vehicle 28, from a control panel in the passenger compartment. The control panel includes actual buttons switches and/or a graphical user interface (GUI) with graphical buttons and switches.

In another embodiment, timing, distances, light patterns and the signal detection circuit 14 the signal generation circuit 16, first warning light 18 and the second warning light 20 on the apparatus 12 are dynamically configured from a smart application on a smart phone 27 or tablet computer/device 29.

A smart phone 27, such as the IPHONE by APPLE, Inc., the DROID by SAMSUNG, Inc. and other, the BLACKBERRY by RESEARCH IN MOTION, etc. and/or on a table computer 29 such as the IPAD, by APPLE, Inc., KINDLE by AMAZON.com, NEXUS by GOOGLE, Inc., etc. are used to dynamically configure the apparatus 12. In such an embodiment, the functionality of the methods are included in the smart application and hardware of the smart phone and/or table computer may also be used to provide hardware for apparatus 12 described herein. The smart phone 17 and/or tablet 29 is plugged into the vehicle 28 with a wire and/or communicates with the vehicle 28 via a wireless interface.

In another embodiment, apparatus 12 is plugged into, and/or manufactured as an integral component of a smart phone and/or a table computer. In such embodiments, the smart phone and/or tablet computer is placed somewhere inside the vehicle 28 and/or carried by an operator of the vehicle 28 and/or mounted in an appropriate rear portion of the vehicle 28 for temporary and/or permanent use.

A "bumper" is a shield made of steel, aluminum, rubber, or plastic that is mounted on the front and rear of a passenger car. When a low speed collision occurs, the bumper system absorbs the shock to prevent or reduce damage to the car. Some bumpers use energy absorbers or brackets and others are made with a foam cushioning material.

A car bumper is designed to prevent or reduce physical damage to the front and rear ends of passenger motor vehicles in low-speed collisions. Automobile bumpers are not typically designed to be structural components that would significantly contribute to vehicle crashworthiness or occupant protection during front or rear collisions. It is not a safety feature intended to prevent or mitigate injury severity to occupants in the passenger cars. Bumpers are designed to protect the hood, trunk, grille, fuel, exhaust and cooling system as well as safety related equipment such as parking lights, headlamps and taillights in low speed collisions.

In the United States, 49 Code of Federal Regulations (CFR) Part 581, "The bumper standard," it includes performance requirements for "passenger cars" in low-speed front and rear collisions. It applies to front and rear bumpers on passenger cars to prevent the damage to the car body and safety related equipment at barrier impact speeds of two mph across the full width and one mph on the corners. Other countries have other safety requirements that are used in a manner similar to those described for the United States.

The current bumper design safety speed of the bumper standard is equivalent to a five mph crash into a parked vehicle of the same weight. The standard requires protection in the region sixteen to twenty inches above the road surface, and the manufacturer can provide the protection by any means it wants. For example, some vehicles do not have a solid bumper across the vehicle, but meet the standard by strategically placed bumper guards and corner guards.

The Federal bumper standard does not apply to vehicles other than passenger cars (i.e., sport utility vehicles (SUVs), minivans, pickups trucks, etc.). The agency has chosen not to regulate bumper performance or elevation for these vehicle classes because of the potential compromise to the vehicle utility in operating on loading ramps and off road situations.

For example, the apparatus 12 is configurable and will automatically turn off when the vehicle is traveling under ten (10) miles-per-hour (mph) and automatically turn on at all speeds above the bumper design safety speed in mph. Further, an appropriate automatic control will limit how many strobe warnings will occur on the first warning light 18 when a slow moving, or bumper-to-bumper traffic situation exists. Given that vehicles now have bumpers rated to withstand collision at about fifteen (15) mph or less, warnings at those slow speeds are not necessary. However, the apparatus 12 can be configured for such slow speed.

In one embodiment, the second warning light 20 will remain on and visible regardless of the vehicle 28 speed, given the importance of the communiqué' it's conveying that the driver has his/her foot off the accelerator.

However, the present invention is not limited to these embodiments and other vehicle speeds and other embodiments can be used to practice the invention.

In another embodiment, the rear end collision prevention apparatus 12 further includes a connection to a front end monitor device 22. The front end monitor device 22 includes a two-dimensional (2D) or three dimensional (3D) camera, Global Positioning System (GPS) monitor motion detector device or other monitoring device that automatically detects when the vehicle 28 comes within a certain distance of any vehicle in front of it or within a certain distance of a solid object (e.g., tree, wall, sign, barrier, stoplight, etc.). The front end monitor device 22 sends a signal to the signal detection circuit 14 which turns on the first warning light 18 and the second warning light 20.

In another embodiment, the front end monitor device 22 sends a first signal to the signal detection circuit 14 which turns on the first warning light 18 when the vehicle 28 is within a first pre-determined distance D1.

In one embodiment the first pre-determined distance D1 includes a distance of about ten (10) feet and/or about three meters. However, the present invention is not limited to the distances described and other distances can be used to practice the invention.

The front end monitor device 22 sends a second signal to the signal detection circuit 14 which turns on the second warning light 20 when the vehicle 28 is within a second closer pre-determined distance D2 to another vehicle 30,31 or an object 33.

In one embodiment the first pre-determined distance D2 includes a distance of about three (3) feet and/or about one meter. However, the present invention is not limited to the distances described and other distances can be used to practice the invention.

In another embodiment, the rear end collision prevention apparatus 12 further includes a connection to a rear end monitor device 24. The rear end monitor device 24 includes a two-dimensional (2D) or three dimensional (3D) camera, GPS monitor or motion detection device or other monitoring device that automatically detects when a second vehicle 30 comes within a certain distance of a rear of the first vehicle 28. The rear end monitor device 24 sends a signal to the signal detection circuit 14 which turns on the first warning light 18 and the second warning light 20.

In another embodiment, the rear end monitor device 24 sends a first signal to the signal detection circuit 14 which turns on the first warning light 18 when the approaching second vehicle 30 is within a first distance behind the first vehicle 28. The rear end monitor device 24 sends a second signal to the signal detection circuit 14 which turns on the second warning light 20 when the second vehicle 30 is within a second closer distance to the first vehicle 28.

The rear end collision prevention apparatus 12 can be used without the front end monitor device 22, without the rear end monitor device 24, with the front end monitor device 22 and without the rear end monitor device 24, with the rear end monitor device 24 and without the front end monitor device 22, and combinations thereof.

However, the present invention is not limited to these embodiments and other embodiments can be used to practice the invention.

In another embodiment, the rear end collision prevention apparatus 12 can also send a wireless signal from a first vehicle 28 to a second vehicle 30 that is following too closely to automatically cause a slowing event on the second vehicle 30.

However, the present invention is not limited to this embodiment and other embodiments can be used to practice the invention.

Figure 5:
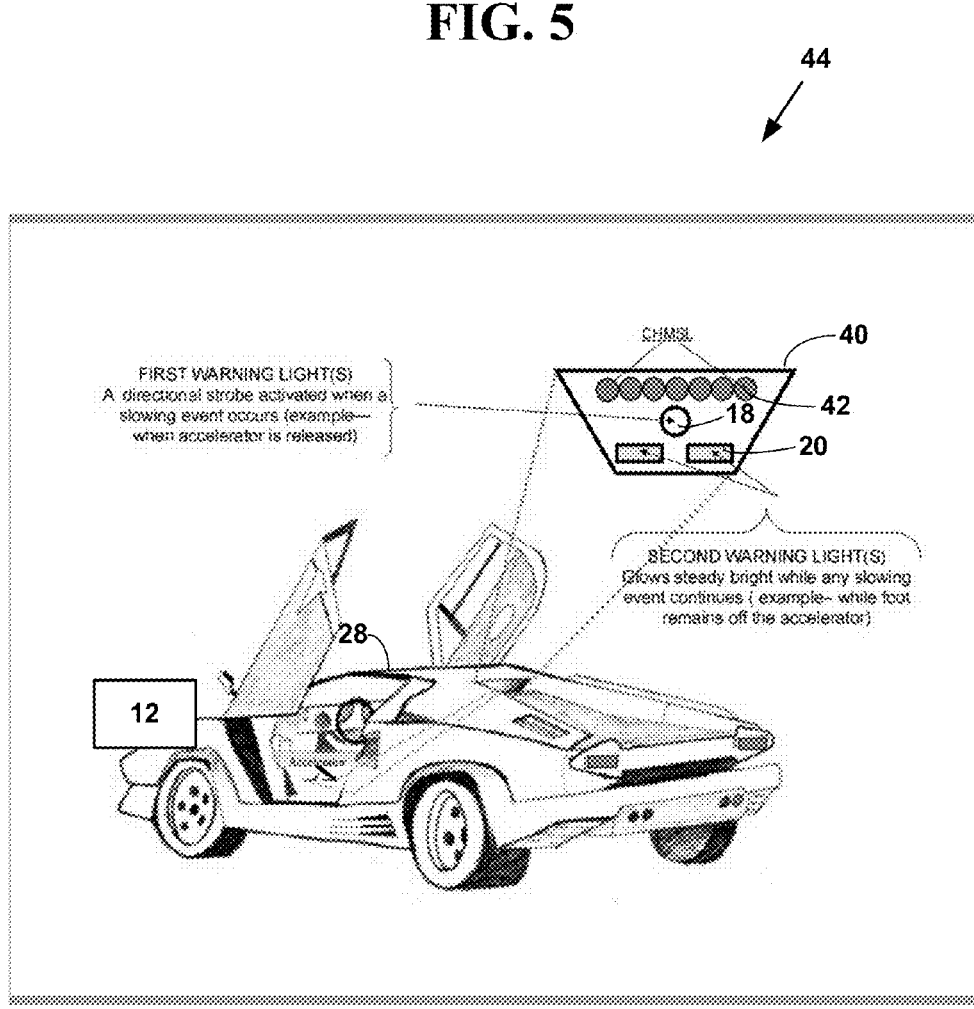
FIG. 5 is a block diagram illustrating the rear end collision prevention apparatus installed in an exemplary automobile.

FIG. 5 is a block diagram 44 illustrating the rear end collision prevention apparatus 12 installed in an exemplary automobile 28.

Figure 6:
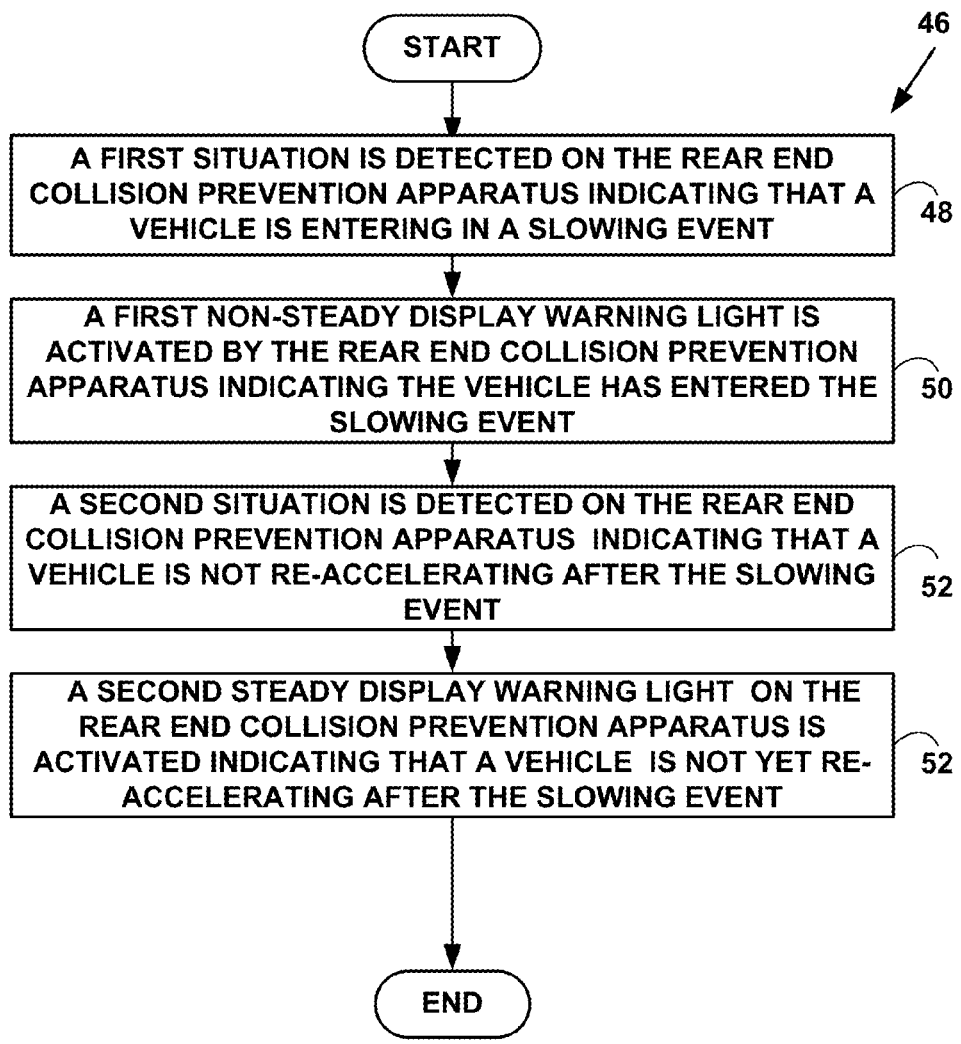
FIG. 6 is a flow diagram illustrating a method for using the rear end collision prevention apparatus.

Method for Using the Rear End Collsion Prevention Apparatus with Independent Light Activation FIG. 6 is a flow diagram illustrating a Method for 46 using the rear end collision prevention apparatus 12. At step 48, a first slowing event is detected on the rear end collision prevention apparatus 12 indicating that a vehicle 28 is entering a slowing event. At Step 50, a first warning light non-steady display (e.g., strobe light, etc.) is automatically activated by the rear end collision prevention apparatus 12 indicating the vehicle 28 has entered the slowing event. At Step 52, a second event is detected on the rear end collision prevention apparatus 12 indicating that a vehicle 28 is not re-accelerating after the slowing event. At Step 54, a second warning light 20 (e.g., continuous display LED, etc.) is automatically activated on the rear end collision prevention apparatus 12 indicating that a vehicle 28 is not yet re-accelerating after the slowing event.

Simultaneous Light Activation

As was described above, the signal generation circuit 16 can be configured for generating a first signal to light up the first warning light 18 and the second warning light 20 simultaneously within a few milliseconds of a pre-determined type (e.g., foot off accelerator, fixed object, emergency event, etc.) slowing event.

In one embodiment, the slowing event comprises only a signal that the acceleration pedal and/or control throttle has been released. However, the present invention is not limited to this embodiment and other embodiments can be used to practice the invention.

Figure 7:
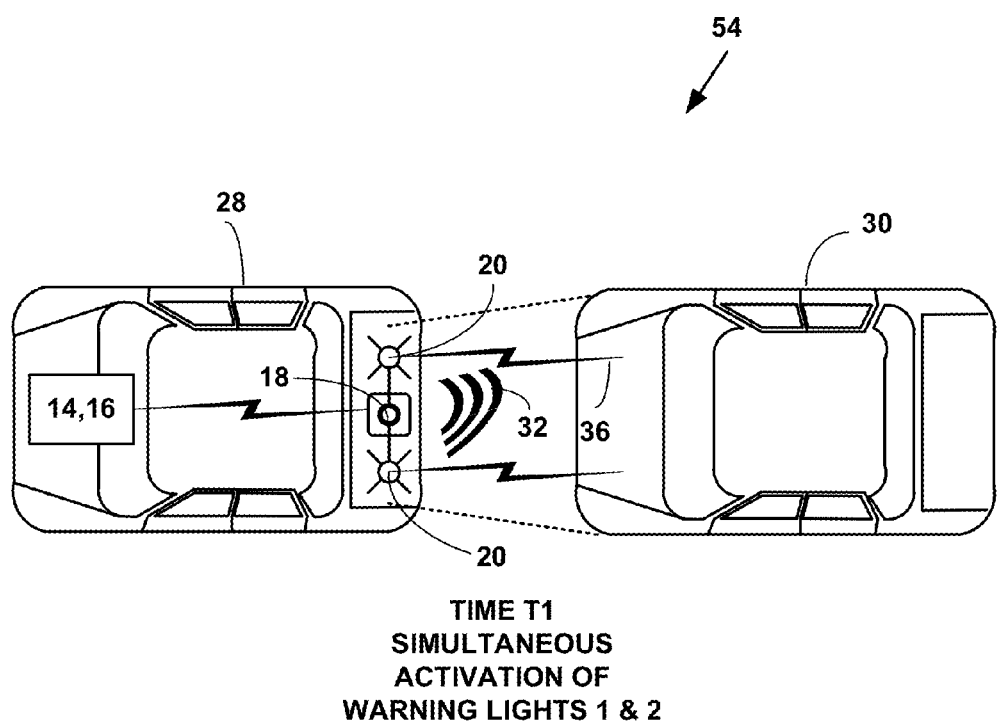
FIG. 7 is a block diagram illustrating the rear end collision prevention apparatus at time T1 with both warnings lights simultaneously activated.

FIG. 7 is a block diagram 54 illustrating the rear end collision prevention apparatus 12 at time T1 with both warning lights 18, 20 simultaneously activated.

In FIG. 7, the signal generation circuit 16 is configured for generating a first signal to light up the first warning light 18 and the second warning light 20 simultaneously within a few milliseconds of a slowing event.

In one embodiment, the first warning light 18 includes a strobe light and sends out a strobe light flash 32 (e.g., white, blue, yellow etc.) and the second warning light 20 includes an LED that sends out a continuous, steady light source 36 (e.g., steady yellow, blue light, etc.).

However, the present invention is not limited to this embodiment and other embodiments can be used to practice the invention.

Figure 8:
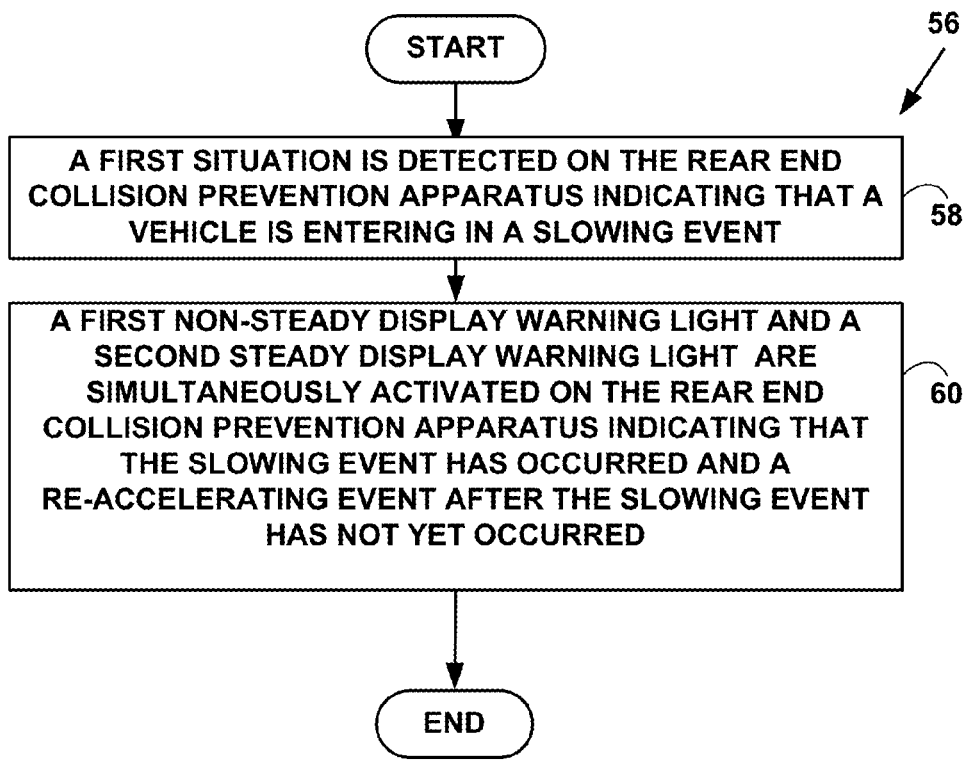
FIG. 8 is a flow diagram illustrating a method for using the rear end collision prevention apparatus with both warnings lights simultaneously activated.

Method for Using the Rear End Collsion Prevention Apparatus with Simultaneous Light Activation FIG. 8 is a flow diagram illustrating a Method 56 for using the rear end collision prevention apparatus 12 with both warnings 18, 20 lights simultaneously activated. At step 58, a first slowing event is detected on the rear end collision prevention apparatus 12 indicating that a vehicle 28 is entering a slowing event. At Step 60, a first warning light non-steady display (e.g., strobe light, etc.) is automatically activated by the rear end collision prevention apparatus 12 indicating the vehicle 28 has entered the slowing event and a second warning light 20 (e.g., continuous LED light, etc.) is automatically and simultaneously activated on the rear end collision prevention apparatus 12 indicating that a vehicle 28 is not yet re-accelerating after the slowing event.

Figure 9:
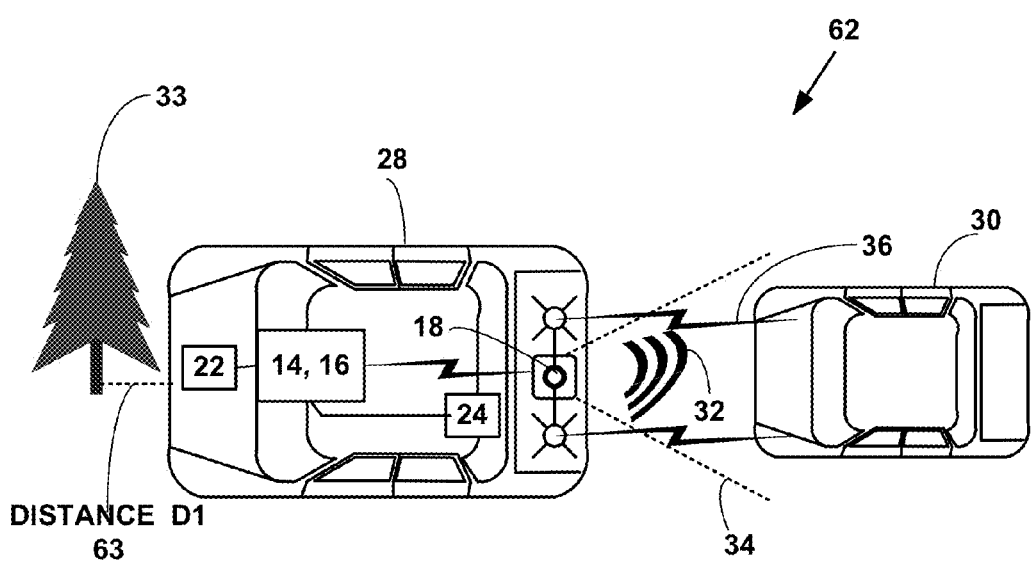
FIG. 9 is a block diagram illustrating the rear end collision prevention apparatus with a fixed objected in front of the moving vehicle.

FIG. 9 is a block diagram 62 illustrating the rear end collision prevention apparatus 12 at a pre-determined distance D1 64 with a fixed objected 33 (e.g., a tree, etc.) in front of the moving vehicle 28 with both first 18 and second 20 warning lights simultaneous activated 32, 34 for pre-determined type (e.g., foot off accelerator, fixed object, emergency event, etc.) slowing event. Moving vehicle 28 also illustrates vehicle 28 with front end monitor 22.

Figure 10:
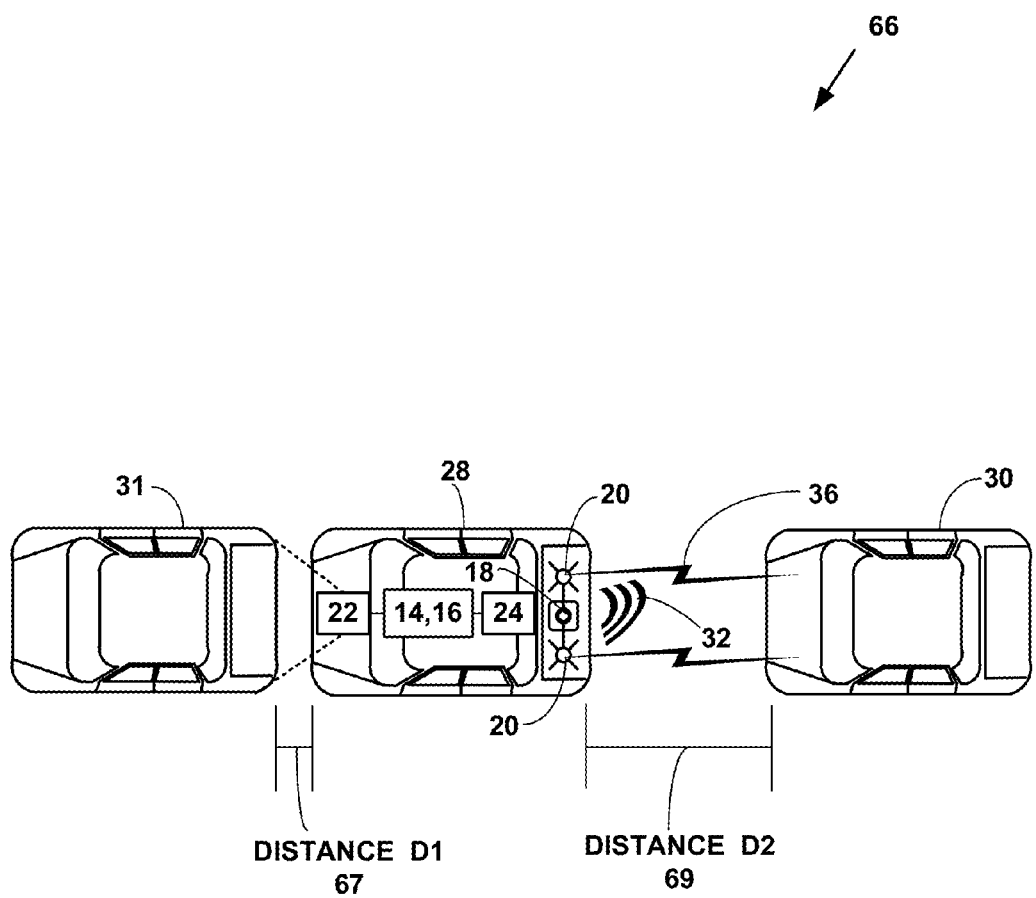
FIG. 10 is a block diagram illustrating the rear end collision prevention apparatus at a first pre-determined distance D1 with another vehicle in front of the moving vehicle and a second pre-determined distance D2.

FIG. 10 is a block diagram 66 illustrating the rear end collision prevention apparatus 12 at a first pre-determined distance D1 67 with another vehicle 33 in front of the moving vehicle 28 and second vehicle 30 behind moving vehicle 28 with both first 18 and second 20 warning lights simultaneous activated 32, 34 for pre-determined type slowing event (e.g., sudden short stop, etc.) visible to second vehicle 30 which is at a second pre-determined distance D1 69. Moving vehicle 28 also illustrates vehicle 28 with front end monitor 22 and rear end monitor 34.

The rear end collision prevention apparatus 12 warns a driver of a vehicle 30 following any vehicle 28 pressure on an accelerator pedal has been removed a split second before the brakes are applied (or well before if a driver is cautious and elects to use coasting or engine holdback based on observing a slowing of the vehicle ahead of it) in a vehicle 28 in front of it. As an option, the rear end collision prevention apparatus 12 could be incorporated into and/or with the existing brake lights and/or CHMSL presently required by law and included with every new automobile and light truck sold. It can also be easily retrofitted into all existing vehicle as an after-market product.

It has been determined experimentally that the rear end collision prevention apparatus 12 helps to significantly reduce rear end collisions, in part because of the two different types of lights used to indicate a slowing event is occurring and a re-acceleration event is not yet re-occurring.

The rear end collision apparatus described herein includes a first warning light to capture a driver's attention indicating a slow down or stop event is about to occur or is occurring and re-focuses a drivers' visual attention point and a different type of second warning light indicating the vehicle has not yet started re-accelerating after a slowing or stop event. The rear end collision prevention apparatus may be integrated into a Center High Mount Stop Lamp (CHMSL) on a vehicle or used as a separate apparatus. The read end collision apparatus helps reduce or prevent rear end collisions of vehicles and reducing or preventing driver acclimatization to warning lights in a CHMSL or other rear end collision warning lights.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

I claim:

1. A rear end collision prevention apparatus, comprising in combination:
    a signal detection circuit configured for detecting a signal from one or more of a plurality of slowing events in a vehicle that is moving:
    (1) releasing of an accelerator pedal or throttle control in the moving vehicle; (2) disengaging a cruise control mechanism previously set and in use in the moving vehicle; (3) engaging a brake pedal in the moving vehicle; (4) receiving an input from a front end monitor in the moving vehicle, wherein the front end monitor automatically detects when a front portion of the moving vehicle comes within a pre-determined distance of another moving vehicle or stopped vehicle in front of the moving vehicle or within a certain distance of a solid object in front of the moving vehicle; (5) receiving an input from a rear end monitor, wherein the rear end monitor automatically detects when a second vehicle comes within a pre-determined distance of a rear portion of the moving vehicle; or (6) receiving an input from steering device indicating a large movement in the steering device;
    a signal generation circuit connected to the signal detection circuit and connected to a first warning light and a second warning light and configured for generating a first signal to turn on the first warning light within a first pre-determined time of one or more of the plurality of slowing events and to turn on the second warning light within a second pre-determined time of turning on the first warning light and for generating a third signal to turn on the first warning light and the second warning light simultaneously;
    the first warning light installed in a rear portion of the vehicle including a directional strobe light installed to be only visible and viewable by only a second vehicle directly behind the moving vehicle, wherein the first warning light provides a first type of visual information that attracts a frontal vision or peripheral vision focus point of a driver driving the second vehicle behind the moving vehicle; and
    the second warning light installed in the rear portion of the vehicle within a pre-determined distance of the first warning light including a static display light also installed to be only viewable by only the second vehicle directly behind the moving vehicle, wherein the second warning light provides a second type of visual information indicating that the moving vehicle has not yet resumed a previous moving speed after the one or more of the plurality of slowing events detected by the signal detection circuit, thereby holding a visual attention of the driver driving the second vehicle behind the moving vehicle,
    the rear end collision prevention apparatus reducing or preventing rear end collisions of vehicles and reducing or preventing driver acclimatization to rear end collision lights.

2. The rear end collision prevention apparatus of claim 1 included in a Center High Mount Stop Lamp (CHMSL) apparatus comprising one or more rear brake lights for the vehicle and providing a standard stop warning to any other vehicles following the moving vehicles whose view of the moving vehicle's left and right stop lamps are blocked by interceding vehicles or other objects, a rear brake light or a third brake light on the vehicle.

3. The rear end collision prevention apparatus of claim 1 wherein the signal detection circuit detects a wired signal or a wireless signal.

4. The rear end collision prevention apparatus of claim 1 wherein the signal detection circuit detects a wireless signal including: a Wireless Personal Area Network (WPAN), Radio Frequency (RF), IEEE 802.11a, 802.11b, 802.11g, 802.11n, 802.15.4 (ZigBee), 802.16a, 802.16g, Wireless Fidelity (WiFi), Worldwide Interoperability for Microwave Access (WiMAX), High Performance Radio Metropolitan Area Network (HIPERMAN) RF Home, Bluetooth, Infrared (IrDA), Radio Frequency Identifier (RFID), Industrial, Scientific and Medical (ISM), Near Field Communications (NFC), Machine-to-Machine (M2M) communications, Internet Protocol (IP), Voice over IP (VoIP), Short Message Service (SMS) or Instant Message (IM) wireless communications protocol signal.

5. The rear end collision prevention apparatus of claim 1 wherein the first pre-determined distance is at least ten feet or at least three meters and wherein the second pre-determined distance is at least three feet or at least one meter.

6. The rear end collision prevention apparatus of claim 1 wherein the first pre-determined amount of time and the second pre-determined amount of time include a pre-determined number of milliseconds.

7. The rear end collision prevention apparatus of claim 1 wherein the directional strobe light of the first warning light includes a white colored directional strobe light.

8. The rear end collision prevention apparatus of claim 1 wherein the first warning light furthers includes a static light portion comprising one or more Light Emitting Diodes (LEDs).

9. The rear end collision prevention apparatus of claim 1 wherein the static light of the second warning light includes one or more Light Emitting Diodes (LEDs).

10. The rear end collision prevention apparatus of claim 1 wherein the static light of the second warning light includes a yellow colored static light.

11. The rear end collision prevention apparatus of claim 1 wherein signal detection circuit is automatically enabled when the vehicle reaches a first pre-determined speed wherein the signal detection circuit is automatically disabled when the vehicle reaches a second slower pre-determined speed.

12. The rear end collision prevention apparatus of claim 11 wherein the first pre-determined speed includes a pre-determined crash safety speed and the second slower pre-determined speed includes at least ten miles-per-hour or at least sixteen kilometers-per-hour.

13. The rear end collision prevention apparatus of claim 12 wherein the pre-determined crash safety speed includes a bumper design safety speed defined by United States 49 Code of Federal Regulations (CFR) Part 581.

14. The rear end collision prevention apparatus of claim 1 wherein the solid object includes a tree, wall, sign, barrier or stoplight.

15. The rear end collision prevention apparatus of claim 1 wherein the vehicle includes a land vehicle, marine vehicle, rail road vehicle or a vehicle used in outer space.

16. The rear end collision prevention apparatus of claim 1 wherein the front end monitor and the rear end monitor include a two-dimensional (2D) or three-dimensional (3D) real-time camera, Global Positioning System (GPS) monitor or other motion detection device.

17. The rear end collision prevention apparatus of claim 1 wherein the first warning light and the second warning light are dynamically configured from a smart application on a smart phone or tablet computer device used within the vehicle.

18. A rear end collision prevention apparatus, comprising in combination:
   a signal detection circuit configured for detecting a signal from a slowing event in a vehicle that is moving including releasing of an accelerator pedal or throttle control in the moving vehicle;
   a signal generation circuit connected to the signal detection circuit and connected to a first warning light and a second warning light and configured for generating a first signal to turn on the first warning light within a first pre-determined time of the slowing event and to turn on the second warning light within a second pre-determined time of turning on the first warning light and for generating a third signal to turn on the first warning light and the second warning light simultaneously;
   the first warning light installed in a rear portion of the vehicle including a directional strobe light installed to be only visible and viewable by only a second vehicle directly behind the moving vehicle, wherein the first warning light provides a first type of visual information that attracts a frontal vision or peripheral vision focus point of a driver driving the second vehicle behind the moving vehicle; and
   the second warning light installed in the rear portion of the vehicle within a pre-determined distance of the first warning light including a static display light also installed to be only viewable by only the second vehicle directly behind the moving vehicle, wherein the second warning light provides a second type of visual information indicating that the moving vehicle has not yet resumed a previous moving speed after the slowing event detected by the signal detection circuit, thereby holding a visual attention of the driver driving the second vehicle behind the moving vehicle,
   the rear end collision prevention apparatus reducing or preventing rear end collisions of vehicles and reducing or preventing driver acclimatization to rear end collision lights.

19. A method for rear end collision prevention for a moving vehicle, comprising:
   detecting on a signal detection circuit on a rear end collision prevention apparatus a slowing event indicating that a moving vehicle is de-accelerating, the rear end collision apparatus comprising in combination:
   a signal detection circuit configured for detecting a signal from one or more of a plurality of slowing events in the moving vehicle,
   a signal generation circuit connected to the signal detection circuit and connected to a first warning light and a second warning light and configured for generating a first signal to turn on the first warning light within a first pre-determined time of one or more of the plurality of slowing events and to turn on the second warning light within a second pre-determined time of turning on the first warning light and for generating a third signal to turn on the first warning light and the second warning light simultaneously,
   the first warning light installed in a rear portion of the vehicle including a directional strobe light installed to be only visible and viewable by only a second vehicle directly behind the moving vehicle, wherein the first warning light provides a first type of visual information that attracts a frontal vision or peripheral vision focus point of a driver driving the second vehicle behind the moving vehicle,
   the second warning light installed in the rear portion of the vehicle within a pre-determined distance of the first warning light including a static display light also installed to be only viewable by only the second vehicle directly behind the moving vehicle, wherein the second warning light provides a second type of visual information indicating that the moving vehicle has not yet resumed a previous moving speed after the one or more of the plurality of slowing events detected by the signal detection circuit;
   automatically activating on the signal generation circuit on the rear end collision prevention apparatus the first warning light indicating the moving vehicle has entered the detected slowing event wherein the first warning light attracts a frontal vision or peripheral vision focus point of a driver driving the second vehicle behind the moving vehicle;

detecting on the signal detection circuit on the rear end collision prevention apparatus a second slow event indicating that the moving vehicle is not re-accelerating after the slowing event; and automatically activating on the signal generation circuit on the rear end collision prevention apparatus the second warning light indicating that the moving vehicle is not yet re-accelerating after the slowing event, wherein the second warning light provides a second type of visual information indicating that the moving vehicle has not yet resumed a previous moving speed, thereby reducing or preventing rear end collisions of vehicles and reducing or preventing driver acclimatization to rear end collision lights.

20. The method of claim 19 further comprising:

detecting on the signal detection circuit on the rear end collision prevention apparatus a pre-determined type of slowing event indicating that the first moving vehicle is de-accelerating; and automatically and simultaneously activating on the signal generation circuit on the rear end collision prevention apparatus the first warning light indicating the first moving vehicle has entered the detected pre-determined type of slowing event and the second warning light indicating that the moving vehicle is not yet re-accelerating after the detected pre-determined slowing event.

* * * * *